United States Patent [19]

Jeppsson

[11] 4,360,039
[45] Nov. 23, 1982

[54] VALVES

[76] Inventor: Håkan E. O. Jeppsson, Åkerlyckan 27, S-245 00 Staffenstörp, Sweden

[21] Appl. No.: 208,402

[22] Filed: Nov. 19, 1980

[30] Foreign Application Priority Data

Nov. 20, 1979 [SE] Sweden ............................. 7909590

[51] Int. Cl.³ ............................................ F16K 11/20
[52] U.S. Cl. ................................ 137/614.19; 137/240; 137/614.11; 137/614.17
[58] Field of Search .............. 137/240, 614.17, 614.19, 137/614.11

[56] References Cited

U.S. PATENT DOCUMENTS 3,895,651  7/1975  Okada et al. .................. 137/614.11
4,103,708  8/1978  Huntington ................... 137/614.11

FOREIGN PATENT DOCUMENTS 2430030  1/1976  Fed. Rep. of Germany ...... 137/240
2609791  9/1977  Fed. Rep. of Germany ...... 137/240
2623301 12/1977  Fed. Rep. of Germany ...... 137/240
2751733  5/1979  Fed. Rep. of Germany ...... 137/240

Primary Examiner—A. Michael Chambers
Attorney, Agent, or Firm—B. P. Fishburne, Jr.

[57] ABSTRACT

A leakproof valve has a valve housing which consists of an upper portion and a lower portion each connectable to a conduit. Between these portions there is a communication which has a conical valve seat with two sealing rings of different diameters. Two outer cone parts in a three-way divided valve cone cooperate with the sealing rings of the valve seat for forming double seals between the upper and lower portions of the valve housing. The third cone part is located between and movable with respect to the two oute cone parts. On closure of the communication, the third cone part will substantially abut against the seat between the sealing rings such that no cavity is formed here. A subsequent shifting of the third cone part with respect to the two outer cone parts opens a communication from the region between the seals to a bleeder outlet.

8 Claims, 4 Drawing Figures

VALVES

BACKGROUND OF THE INVENTION

The present invention relates to a valve for opening and closing the communication between a first and a second conduit, the valve comprising a housing with an upper portion, a lower portion and an interposed communication which may be closed and opened by means of two spaced apart sealing members which each cooperate with their obstruction members for forming double seals between the upper and lower portions of the housing, which portions may be connected each to a conduit.

Valves of the cone type which form double obstructions between two conduits are well known. When these valves are closed, there is formed between the two obstructions a space which is in communication with the atmosphere. The advantage inherent in these valves is that leakage in one of the obstructions is led out into the atmosphere outside the valve. This arrangement prevents liquid from the one conduit from being mixed with liquid in the other conduit interconnected to the valve.

In processing plants it is desirable to be able to shut off various sections of an installation from each other in a reliable manner so as to prevent mixture of different media. For example, it is occasionally desirable to shut off a section of the installation for cleaning purposes, while the remaining parts of the installation are in operation and are filled with processing medium. In such cases, it is necessary to ensure that cleaning liquid from that section which is being cleaned cannot leak into the processing medium in the section of the installation which is still in operation. In order to satisfy this requirement, use is normally made of double valves or valves with double cones of the type described in West German Pat. No. DT 26 32 587, the disclosure of which is hereby incorporated by reference.

Valves used hitherto for this purpose have, however, proved to possess a plurality of inconveniences. Thus, a minor amount of liquid often leaks out when the valve is switched, either because the interior of the valve is momentarily placed in communication with the bleeder outlet or because a body of liquid enclosed between the two sealing surfaces leaks out through the same outlet. The above inconvenience entails that cleaning of the bleeder chamber and its outlet must often be carried out. When the double reliability of the valve is deranged on flushing with cleaning liquid through the bleeder chamber, this is a serious shortcoming in the valve.

It would, therefore, be desirable if the intervals between such cleaning operations could be extended such that cleaning is effected at times when no product is present in the conduits.

There is a known possibility of circumventing these difficulties, namely with a valve of the sliding type in which the shut off member consists of a movable ported cylinder. However, this valve is based on a constructional principle which has proved in practice to possess diadvantages in the form of heavy wear on the sealing members and movable fittings. Neither is this principle applicable to conventional valves of the cone type, which entails that the principle cannot be utilized for reconstructing extant, conventional cone valves. Furthermore, the lower chamber of the valve contains a pocket constituting the communication with the upper chamber of the valve, this pocket being unsuitable from the point of view of cleaning operations.

SUMMARY OF THE INVENTION

The above mentioned inconveniences have now, according to the present invention, been obviated by means of a valve of the type disclosed by way of introduction, the valve being substantially characterised in that there is disposed, between the two obstruction members a third obstruction member which is designed such that there is substantially no cavity between the sealing members when the seals are formed, this third obstruction member being operative to open a communication from the region between the seals to a bleeder outlet first after the formation of the double seals and, respectively to close the latter communication prior to breaking of the seals.

A valve designed in this manner gives, in the closed position, double security against leakage, and no liquid leakage occurs during the switching of the valve.

BRIEF DESCRIPTION OF THE ACCOMPANYING DRAWINGS

The nature of the present invention and its aspects will be more readily understood from the following brief description of the accompanying drawings, and discussion relating thereto.

In the accompanying drawings

FIGS. 1, 2 and 3 show side elevations of one embodiment of the valve according to the invention in different closure phases; and FIG. 4 shows a second embodiment of the valve according to the invention in the closed position.

DESCRIPTION OF THE PREFERRED EMBODIMENTS

Figure 1:
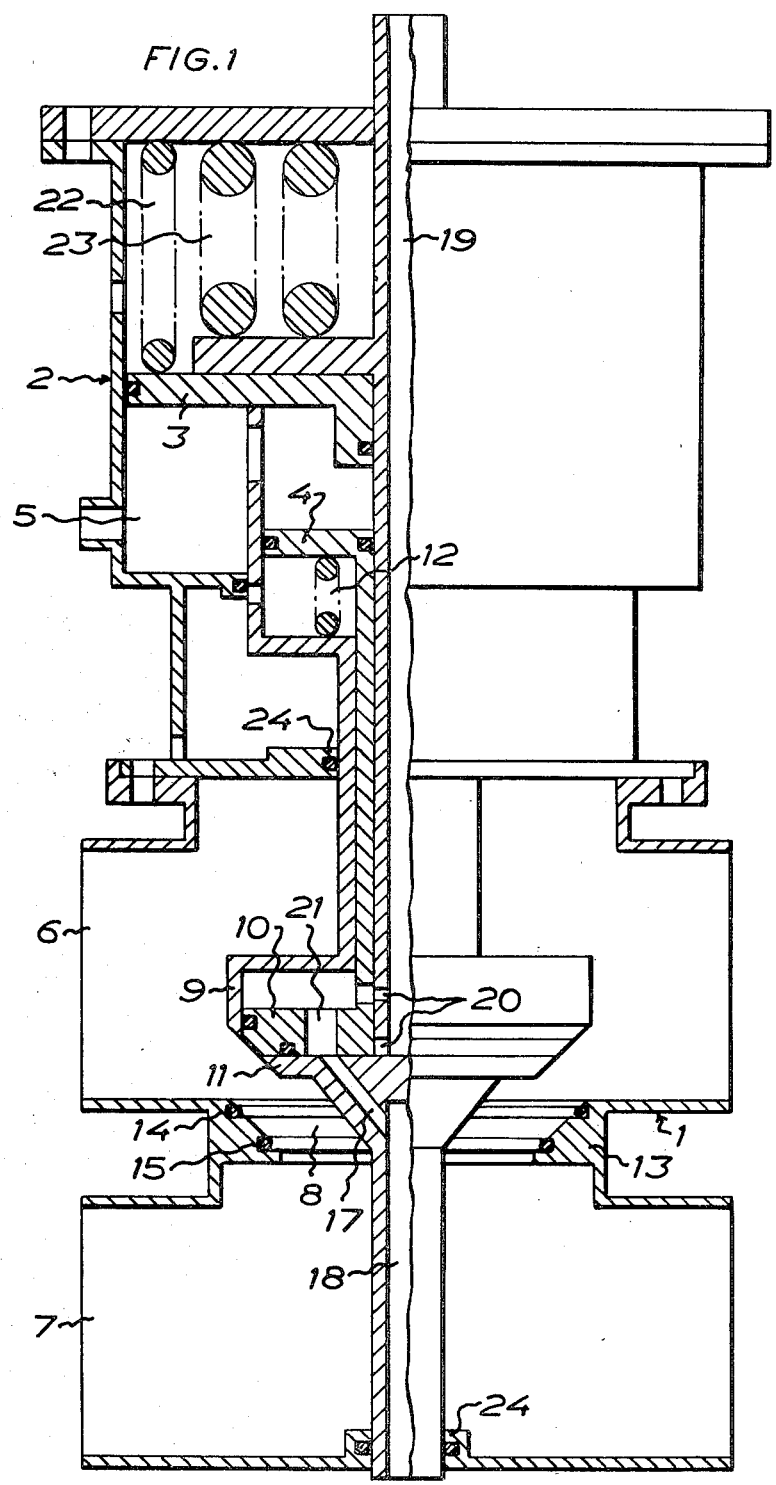
Figure 2:
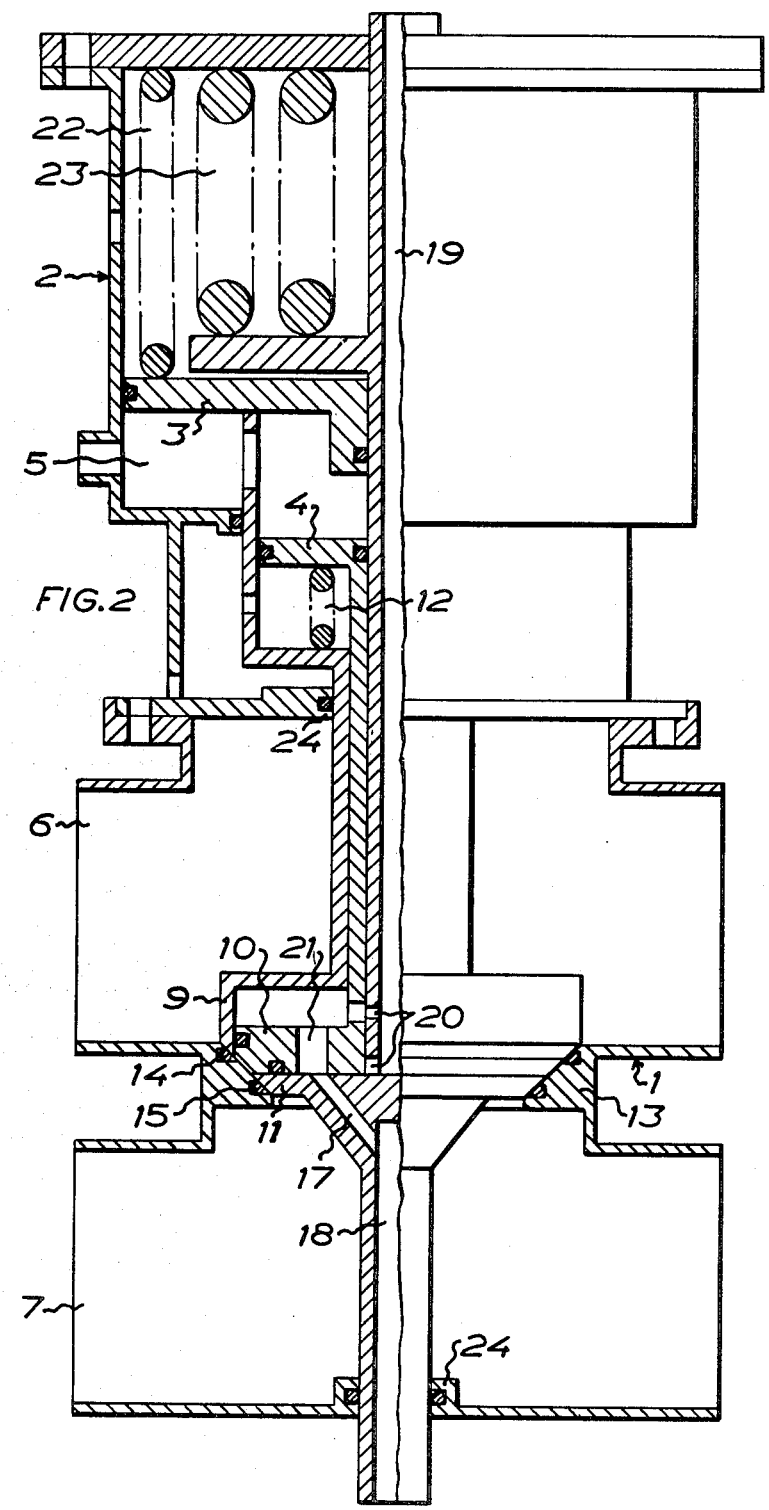
Figure 3:
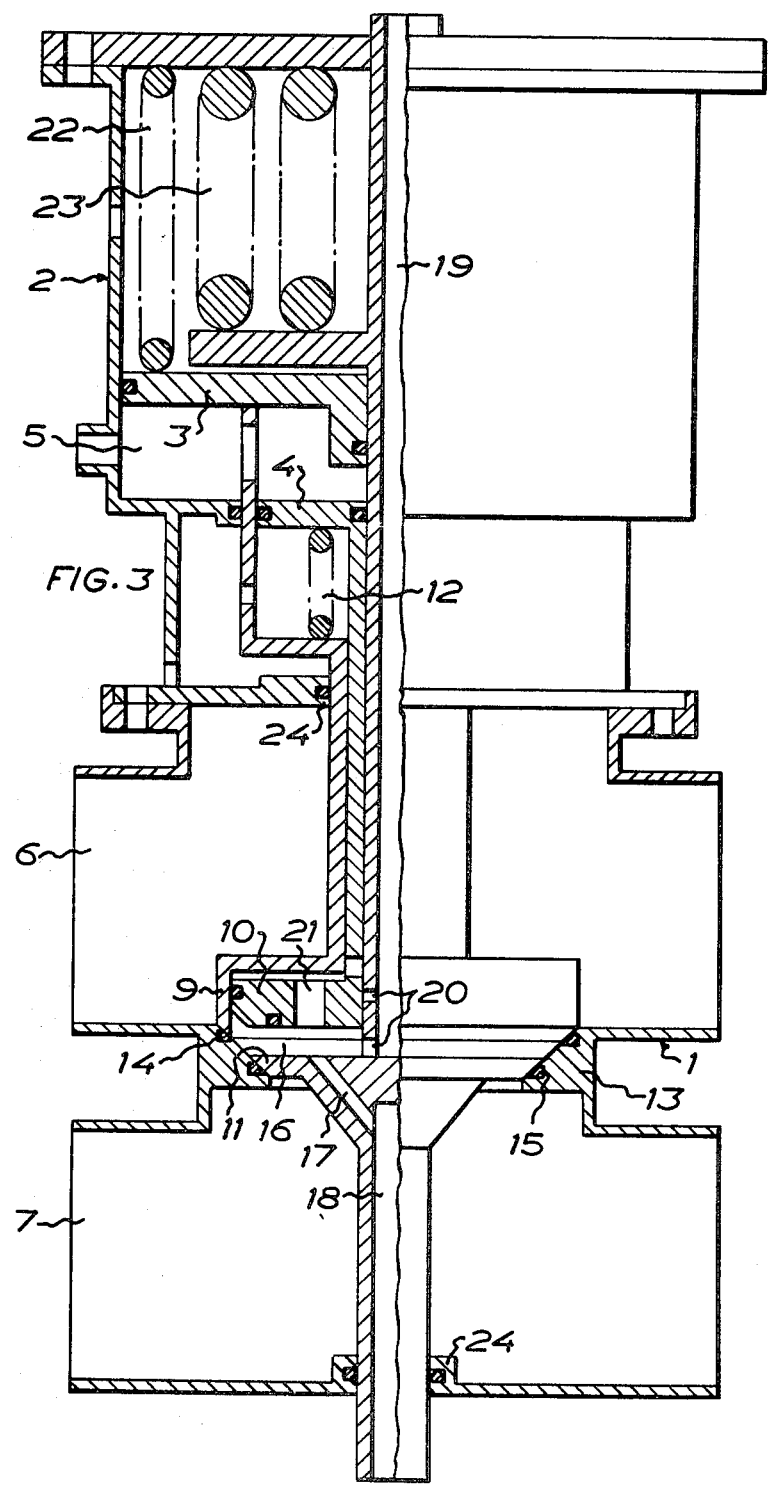

The valve illustrated in FIGS. 1, 2 and 3 comprises a valve housing 1 with an air motor 2 consisting of two spring-loaded pistons 3 and 4, and a chamber 5 which is supplied with and drained of compressed air, respectively, for the operation of the valve.

The valve housing 1 consists of an upper portion 6 and a lower portion 7. Between these two parts, which may each be connected to their conduit, there is a communication 8. This communication may be shut off by means of obstruction members in the form of valve cones 9, 10 and 11.

The valve cone 10 is connected to the piston 3 by the intermediary of a spring 12. The valve cone 9 is fixedly secured to the piston 3, whereas the valve cone 10 is freely movable with respect to the cones 9 and 11 and fixedly connected to the piston 4.

When the communication 8 is to be shut off, a communication is opened between the air chamber 5 and the atmosphere, the pressure falling in this chamber. The pistons 3 and 4 will then move downwardly from the starting position illustrated in FIG. 1, the valve cones 9, 10 and 11 moving down towards a seat 13. The communication between the parts 6 and 7 is now closed and sealed by means of sealing rings 14 and 15. This closure phase is illustrated in FIG. 2.

When the pressure has further fallen in the chamber 5, the piston 4 will move upwardly as a result of the pressure of the spring 12, the cone 10 moving also upwardly to the position shown in FIG. 3. The closure operation is now completed.

When the valve is opened, this procedure progresses in the reverse order.

Should leakage occur in a sealing ring 14 or 15, this will merely result in liquid running into the space 16 formed as a result of the upward movement of the cone 10. This space is now in communication with the atmosphere via a channel 17 and a channel 18. The leakage will thereby be bled out through these channels.

On cleaning of the portion 6, processing liquid may now be present in the portion 7 and vice versa without risk for intermixture.

Since the cone 10 is not moved until after the sealing rings 14 and 15 have commenced their function, no leakage will occur on operation of the valve other than solely in the case of a faulty sealing ring 14 or 15.

On cleaning of the space 16, which takes place only occasionally and, therefore, does not require double obstruction, cleaning liquid is supplied through a channel 19. This liquid is led into the space 16 through channels 20 and 21. After flushing of the space 16, the cleaning liquid runs out through the channel 17 and the channel 18.

If a pressure hammer were to occur in the upper portion 6 of the valve, the cone 9 is forced even harder against the seat 13 which thereby remains sealed.

If a pressure hammer were to occur in the lower portion 7 of the valve, the cone 11 is lifted, whereas the cones 9 and 10 are retained in place by a spring 22. When communication has been established between the space 16 and the portion 7, the pressure will be reduced, since space 16 is in communication with the atmosphere, the cone 11 moving, under the action of a spring 23, once again downwardly and sealing off the communication by the sealing ring 14.

It will be apparent from the above that the embodiment of the valve according to the present invention as illustrated in FIGS. 1, 2 and 3 offers complete reliability against leakage between the portion 6 and the portion 7. It is, hereby, possible to clean the one conduit associated to one part of the valve, while the other conduit is filled with processing liquid. Consequently, a part of the processing installation may be kept in operation at the same time as another part of the installation is cleaned, and downtime for cleaning the valve is avoided.

As a result of the illustated embodiment of the valve according to the invention, having a seat 13 which conically tapers in the closure direction of the valve cones, no pocket will be formed containing residual product which pollutes the bleeder space 16 when the cone 10 is lifted. Furthermore, the advantage will be attained that the sealing rings 14 and 15 are not subjected to any great extent to sliding (and thereby abrasive) movement from the cones 9 and 11. A further advantage inherent in the illustrated embodiment of the valve according to the invention is that there is no compression of the medium in the portion 7 on closure of the valve, since the communication between the portion 6 and the portion 7 is kept open during the greater part of the closure phase. Yet a further advantage is that, in the event of a pressure hammer in the portion 7, only a slight upward movement of the cone 11 will be required to allow a sufficiently large opening between the portion 7 and the bleeder space 16 to make for a reduction in pressure.

The following features are characteristic of the above-described embodiment of the valve according to the present invention.

In the closed position, the valve provides full reliability against leakage between the two conduits, which is of particular importance within the foodstuffs, industry.

Thanks to this feature, a section of the processing installation may be shut down in order to be cleaned while another portion of the installation is in operation. Furthermore, no leakage occurs when the valve is switched. Moreover, the valve contains no sealings of large diameter which must be cleaned at spindle lead-throughs 24. Neither are there any such sealing rings between the two portions 6 and 7 as can be exposed to heavy abrasion from passing metal edges. The above-described valve according to the present invention contains no pockets or other nooks in the process portions 6 and 7 which are difficult to clean.

The valve can be subjected to pressure hammers without leakage occuring between the two portions. There is no compression or pressure drop in the medium in the portions 6 and 7 on closure of the valve.

The valve also possesses the advantage that it can utilize extant parts from shut-off valves of the cone type with simple service measures and smaller storage requirements as a result.

Figure 4:
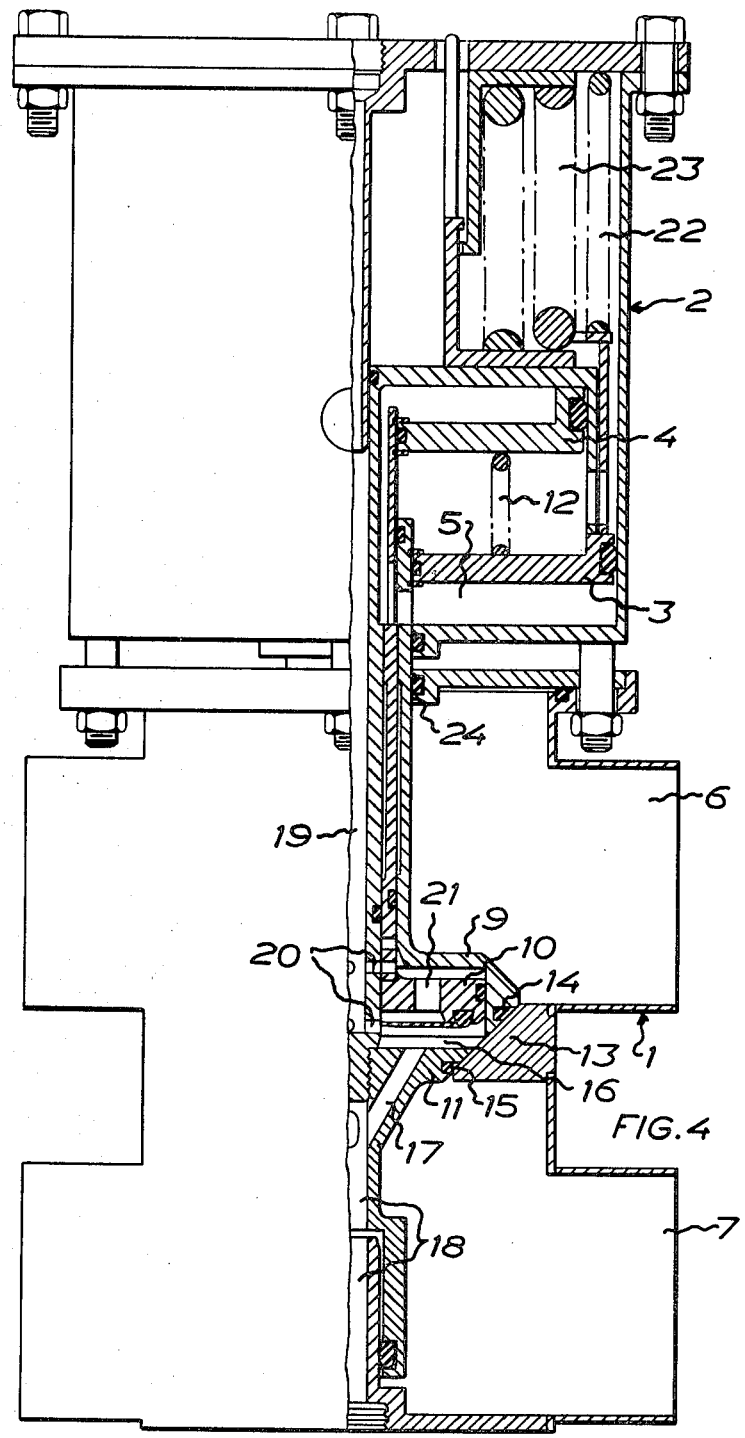

Substantially all of the above disclosure concerning the embodiment according to FIGS. 1 to 3 is also valid for the embodiment of FIG. 4, in which the reference numerals utilized are the same as in FIGS. 1 to 3. As will be apparent from a comparison between these two embodiments, the embodiment of FIG. 4 differs from that of FIG. 3 primarily by the construction of the passage of the channel 18 through the valve housing portion 7, by the reversed positions of the pistons 3 and 4 in the air motor 2, and by the location of the sealing members 14 and 15 on the cones 9 and 11 instead of on the seat 13. The air motor construction illustrated in FIG. 4 makes for relatively greater surface area of the piston 4. In both of the embodiments, the spring 12 is weaker than the spring 23.

Finally, is should be pointed out that the air motor 2 is vital to the function of the valve according to the present invention, and in itself may be considered as an invention, as will be apparent from the appended claims.

I claim:

1. A leak-proof valve comprising a housing having an upper portion, a lower portion and a valve seat defining an axial passage therebetween; two valve heads axially movable with respect to the valve seat between a closed position in which the valve heads bear against spaced-apart ring portions of the valve seat, and an open position in which the valve heads are axially cleared from the valve seat, said valve heads being axially spaced apart to define a leakage cavity therebetween; a bleeder outlet connected to the leakage cavity; a third valve head axially movable within the leakage cavity and configured to conform to the valve seat surface between the two ring portions thereof; and means for moving the third valve head for opening a communication from a region between the two ring portions of the valve seat to the bleeder outlet first after the two valve heads are moved into the closed position, and for closing said communication before the two valve heads are moved toward the open position.

2. A leak-proof valve as defined in claim 1, wherein said two valve heads are designed as two parts of a cone or piston.

3. A leak-proof valve as defined in claim 2, wherein said third valve head is designed as a third part of the cone or piston disposed between said two parts of the cone or piston.

4. A leak-proof valve as defined in claim 3, wherein the valve seat and the valve cone parts conically taper in the closure direction of the valve cone.

5. A leak-proof valve as defined in claim 1, wherein the two valve heads are mutually movable.

6. A leak-proof valve as defined in claim 5, further comprising a single air cylinder with a plurality of spring-biased pistons for operating the valve heads.

7. A leak-proof valve as defined in claim 6, wherein two of the pistons have directions of movement which are opposed to one another and opposed to their respective spring bias, on compressed air actuation.

8. A leak-proof valve as defined in claim 8, wherein the pistons have piston surfaces of different sizes, and the piston of the smaller piston surface is more weakly spring-biased than, and has a restricted length of travel with respect to, the piston having the larger piston surface.

* * * * *